April 8, 1958     W. E. CUNNINGHAM     2,829,439
DIRECT READING MEASURING DEVICE
Filed Aug. 23, 1956
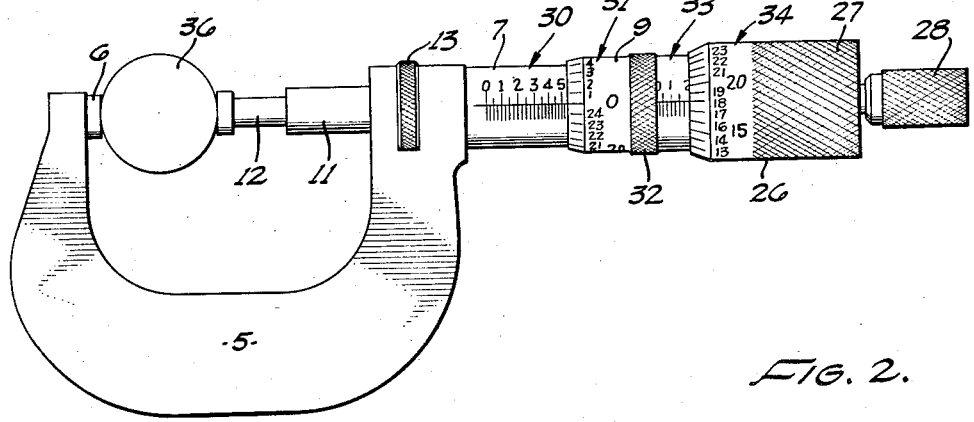
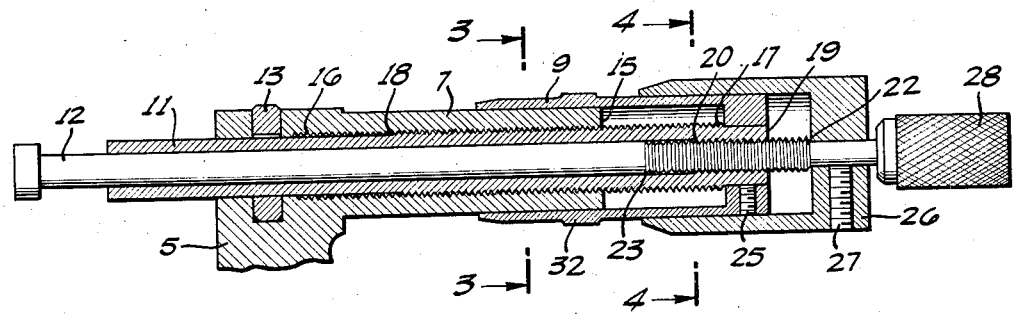
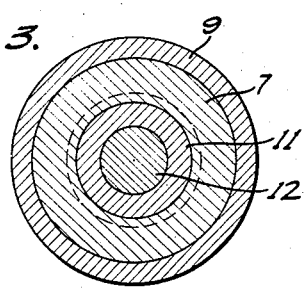
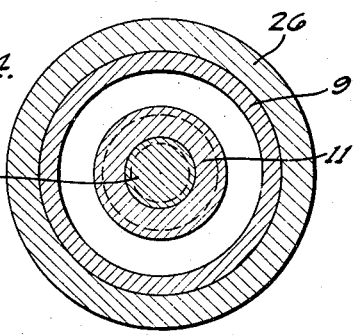
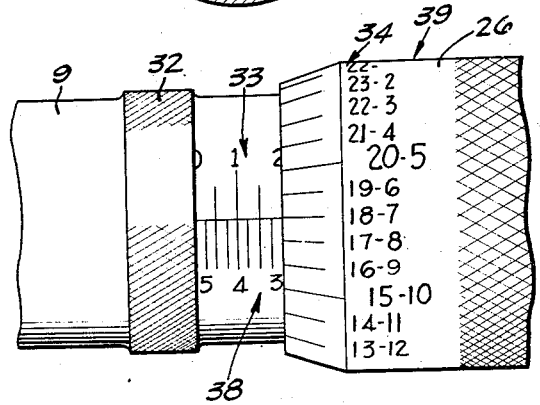
INVENTOR.
WILLIAM E. CUNNINGHAM
BY
ATTORNEY

United States Patent Office 2,829,439
Patented Apr. 8, 1958

2,829,439

DIRECT READING MEASURING DEVICE

William E. Cunningham, Visalia, Calif.

Application April 23, 1956, Serial No. 579,874

4 Claims. (Cl. 33—166)

This invention relates to a tool and particularly to a calculating micrometer which will give a direct reading of the amount of material to be removed in turning, planing, milling, shaping, boring and similar operations.

Various types of micrometers for this purpose are known, as evidenced by U. S. Patents No. 2,639,510 of May 26, 1953 and No. 2,666,263 of January 19, 1954. The present invention is a similar type of micrometer having a minimum of elements or parts required for its complete functioning. One feature of its construction is the embodiment of two coaxially aligned spindles, both of which are controlled by one thimble and one by a second thimble. In this manner, the outer spindle in which the inner spindle is axially movable may be set to the desired size of the finished work and locked, after which the stock is measured by the inner spindle, and the indicia will give a direct reading of the amount of material to be removed. Thus, a machinist using the calculating micrometer need not do any computing, mental or on paper, but will know at any time he makes a measurement the amount of material to be removed.

Another feature of the invention is its use for inside measurements, which, by a reverse scale on the second thimble, will also provide direct readings of the amount of boring to be done.

The principal object of the invention, therefore, is to facilitate the measuring of stock with a micrometer.

Another object of the invention is to provide an improved micrometer which will directly indicate the amount of material to be removed in a machining operation.

A further object of the invention is to provide a micrometer having a minimum of parts and which will provide direct readings for both outside and inside measurements.

The novel features which are believed to be characteristic of this invention, both as to the manner of its organization and the mode of its operation, will be better understood from the following description when read in conjunction with the accompanying drawings, in which:

Fig. 1 is a side view of the micrometer embodying the invention;

Fig. 2 is a cross-sectional view of the micrometer shown in Fig. 1;

Fig. 3 is a cross-sectional view taken along the line 3—3 of Fig. 2;

Fig. 4 is a cross-sectional view taken along the line 4—4 of Fig. 2; and

Fig. 5 is an enlarged detail view showing the indicia for indicating outside and inside calculations.

Referring now to the drawings in which the same reference numerals indicate the same elements, a frame 5 of any suitable shape has the usual anvil 6, the other end of the frame having a hollow cylindrical extension to form a hub or barrel 7 for an inner thimble 9. The micrometer is provided with two spindles, an outer sleeve spindle 11 and a shaft or rod inner spindle 12. An eccentric locking ring 13 is provided to lock the sleeve spindle 11 at any adjusted position. The hub 7 is interiorly threaded from its end 15 to the point 16, while the sleeve spindle 11 is exteriorly threaded from point 17 to the point 18. The sleeve spindle 11 is also interiorly threaded from its end 19 to the point 20, while the inner rod spindle 12 is threaded from point 22 to point 23. It will be noted that the outer and inner threads of sleeve spindle 11 have their roots along the surfaces of the full diameters of the sleeve to provide the maximum wall thickness in the interest of strength.

Sleeve spindle 11 is attached to the inner thimble 9 in any suitable manner, such as by a set screw 25, so that rotation of the thimble 9 will move both spindles 11 and 12 axially of the hub 7. The inner rod spindle 12 is connected to an outer thimble 26 by any suitable means, such as by a set screw 27. The end of the rod spindle 12 may terminate in any standard ratchet stop 28. Along the hub 7 are linear indicia 30, and on the thimble 9 are annular indicia 31, the usual knurled section 32 being provided. Also on the thimble 9 are linear indicia 33, while the cooperating annular indicia 34 are shown on outer thimble 26 with its knurled section 27.

To operate the micrometer, the ring 13 is loosened and the thimble 9 set to the final diameter of a stock to be worked, such as shown at 36, which stock is to be turned to a smaller diameter. Assume for purpose of illustration that the stock 36 is to be turned to a final diameter of .627 of an inch from an original diameter of .743 of an inch. In this instance, the amount of material to be removed would be .743 of an inch minus .627 of an inch, or .116 of an inch. It is quite possible that by using mental arithmetic to figure this subtraction, a result of .126 would be obtained and the machinist would make a rough cut to remove .120 of an inch. The result would be a shaft .004 of an inch too small.

With the invention, it would only be necessary to set the indicia 30—31 to read .627 of an inch. The outside sleeve spindle 11 would then be locked in position by the ring 13. The next step would be to measure the stock as shown in Fig. 1, and by doing so, the indicia 33—34 would immediately indicate .116 of an inch. In addition to its use as just explained, the micrometer may be used as a regular micrometer. To do this, the indicia 30—31 would be used for measurements up to one inch when the indicia 33—34 is set to zero. Measurements between one inch and one and one-half inches would then be read with the indicia 33—34, the reading being one inch plus the reading on indicia 33—34.

As mentioned above, the micrometer may be used for making direct readings of the amount of material to be removed for inside machining, the present measurement being taken from a telescoping gauge. As will be noted in Fig. 5, the indicia of Fig. 1 are shown at 33—34. In addition, linear indicia 38 and cooperating annular indicia 39 are provided, the indicia 38—39 being in reverse order to that of the indicia 30—31. To distinguish the two cooperating scales, indicia 33—34 may be in one color, such as white, and indicia 38—39 could be in another color, such as red.

To give an example of the use of the micrometer for inside measurements, we will assume that the desired diameter for an opening or hole, which now is .693 of an inch, is to be increased to .875 of an inch. In this example, the thimble 9 would be set at .875 minus .500 or .375 of an inch. The thimble 26 would then indicate .318 on indicia 33—34 and .182 on indicia 38—39. The indicia 33—34 would show that the present diameter was .375 of an inch plus .318 of an inch or .693 of an inch, while the indicia 38—39 would indicate that the diameter would have to be increased .182 of an inch to become the desired .875 of an inch. Therefore, by the use of the two respective cooperating scales, both the outside and inside reduction or increasing amounts in the measurements may be read directly and no mental arithmetic is required.

By the use of two axially aligned spindles, such as 11 and 12, the entire micrometer is reduced to a minimum of parts, making it economical to manufacture, simple to operate, and easy to maintain in operating condition.

Since the basic scale is set and locked, there will be very little wear on the threads between the screw spindle sleeve and the hub. If wear on the screw spindle threads becomes excessive to the point where the accuracy of the micrometer is impaired, the entire screw assembly, the screw spindle, and the screw spindle sleeve can be easily replaced with a new pair at a very low cost, as the two old thimbles would be used and attached to the new parts with screws 25 and 27. A recalibration is then made. An extra set of screw spindle and screw spindle sleeve can be included with the original calculating micrometer. A vernier scale may be included on the barrel of the calculating thimble.

A direct reading inside micrometer could be provided by replacing the U frame with a T frame, the calculating mechanism being one part of the cross of the T, an extension of the anvil to the outside being the other part of the cross of the T, and a short handle being the leg of the T. The distance from the face of the anvil to the tip of the ratchet would then be directly calculated.

I claim:

1. A micrometer for directly indicating the amount of material to be removed therefrom to reach a certain desired dimension thereof comprising a frame having an anvil section and a hollow hub section, a pair of coaxial spindles within said hub section, the ends of both of said spindles extending beyond both ends of said hub section, one of said spindles threadably engaging said hub section over an appropriate distance, a thimble attached to said one of said spindles for the rotation of both of said spindles, a second thimble in which said first thimble is accommodated, said second thimble being rotatable on said first thimble and attached to said other spindle for the rotation thereof within said one spindle, said other spindle being threaded to said one spindle, cooperating indicia on said hub and said first-mentioned thimble to directly indicate a predetermined certain desired dimension of said material, and cooperating indicia on said first-mentioned thimble and said second-mentioned thimble to directly indicate the dimension of the material to be removed to reach the certain desired dimension of said material.

2. A micrometer in accordance with claim 1 in which said one spindle is a sleeve spindle and said other spindle is a rod spindle, the outer and inner threads of said sleeve spindle having their roots along the surfaces of the full diameters of said sleeve spindle.

3. A micrometer in accordance with claim 1 in which the cooperating indicia on said first-mentioned thimble and the cooperating indicia on said second-mentioned thimble each includes two sets of cooperating indicia arranged in reverse order.

4. A micrometer construction comprising a U-shaped frame having an anvil at the end of one leg and a hollow cylindrical extension at right angles to the other leg, a pair of concentrically positioned and axially movable spindles within said extension, said spindles being movable simultaneously in the same direction and one with respect to the other, a thimble rotatable on said extension and attached to the outer one of said pair of spindles, means for locking said outer one of said pair of spindles to said extension when one end thereof is at a predetermined position with respect to said anvil, and a second thimble rotatable on said first thimble and attached to said inner one of said pair of spindles to adjust one end of said inner one of said pair of spindles with respect to said anvil, said outer spindle being threaded to said extension and to said inner spindle, the threads of said outer spindle having their roots along the surfaces of the full diameters of said outer spindle.

References Cited in the file of this patent
UNITED STATES PATENTS

| | | |
|---|---|---|
| 672,622 | Isherwood | Apr. 23, 1901 |
| 2,545,782 | Hugin | Mar. 20, 1951 |
| 2,666,263 | Laserson | Jan. 19, 1954 |

FOREIGN PATENTS

| | | |
|---|---|---|
| 143,615 | Great Britain | May 25, 1920 |